United States Patent

[11] 3,552,714

[72] Inventor Charles J. Manville
Saint Petersburg Beach, Fla.
[21] Appl. No. 727,616
[22] Filed May 8, 1968
[45] Patented Jan. 5, 1971
[73] Assignee Manville Manufacturing Corporation
Pontiac, Mich.
a corporation of Michigan

[54] TORQUE FREE VALVE ASSEMBLY
1 Claim, 5 Drawing Figs.

[52] U.S. Cl............................................. 251/88,
137/559
[51] Int. Cl............................................. F16k 25/00,
F16k 37/00
[50] Field of Search............................................. 251/288;
137/559

[56] References Cited
UNITED STATES PATENTS

| | | | |
|---|---|---|---|
| 123,584 | 2/1872 | Shriver............................ | 251/88 |
| 1,111,391 | 9/1914 | Kneass............................ | 251/86 |
| 1,694,595 | 12/1928 | Howard........................... | 251/88 |
| 1,787,236 | 12/1930 | Dopp.............................. | 251/88 |
| 2,352,249 | 6/1944 | Briggs............................. | 251/88 |
| 2,876,982 | 3/1959 | Snider............................. | 251/88 |
| 3,199,833 | 8/1965 | Skinner........................... | 251/357X |
| 3,238,968 | 3/1966 | Pecis.............................. | 137/556 |
| 2,848,187 | 8/1958 | Henry............................. | 251/88X |

FOREIGN PATENTS

| | | | |
|---|---|---|---|
| 859,558 | 1/1961 | Great Britain................. | 251/88 |
| 342,052 | 12/1959 | Switzerland................... | 251/88 |
| 988,061 | 4/1951 | France........................... | 251/88 |

Primary Examiner—Henry T. Klinksiek
Attorney—Woodard, Weikart, Emhardt & Naughton ABSTRACT: A valve housing with a fluid inlet and fluid outlet and a valve seat in a passageway therebetween. A seal mount in the passageway, with a bib-washer thereon to engage the valve seat, and with an O-ring thereon to prevent leakage from the housing along the valve operating stem. A split ring freely received on a groove in the stem and snugly received in a bore on the seal mount for connection therebetween, permitting free-floating seal action and torque-free stem rotation for valve operation.

PATENTED JAN 5 1971

3,552,714

INVENTOR
CHARLES J. MANVILLE
BY
Woodard, Weikart, Emhardt & Naughton
Attorneys

TORQUE FREE VALVE ASSEMBLY

BACKGROUND OF THE INVENTION

1. Field of the Invention

This invention relates generally to fluid flow controls and more particularly to valves capable of virtually complete opening and closure.

2. Description of the Prior Art

Various efforts have been made to provide good sealing and minimal wear in valves. Some examples of results disclosed in patents are as follows:

2,704,650 Rand Mar. 22, 1955
2,893,687 Huthsing Jul. 7, 1959
2,952,439 Koons Sept. 13, 1960
3,199,833 Skinner Aug. 1965.

In spite of the prior art efforts, there has remained a need for a practical, low-cost, long-wearing valve assembly. It is submitted that the present invention meets this need.

SUMMARY

Described briefly, in a typical embodiment of the present invention, a valve stem is provided with a seal mount thereon, employing a split ring freely rotatable in a groove of the stem and frictionally secured in a bore of the seal mount. The seal mount has a bib-washer mounted thereon for valve operation, and an O-ring seal thereon for prevention of leakage past the stem.

DESCRIPTION OF THE PREFERRED EMBODIMENTS

Figure 1:
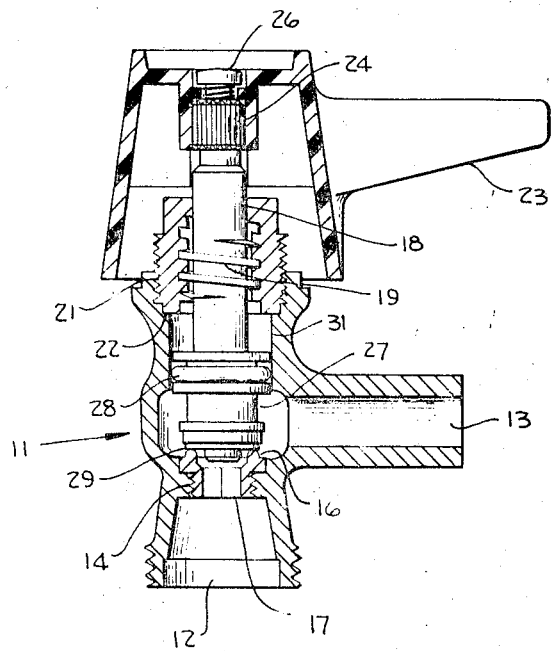
FIG. 1 is a vertical section through a valve assembly illustrating a typical embodiment of the present invention.

In FIG. 1, a valve body or housing 11 is provided with an inlet 12 and an outlet 13, with a suitable passageway communicating between the inlet and outlet. Such an arrangement could be used in any fluid conveying system, but typically is applied to hot and cold water plumbing fixtures. A valve seat unit 14 is threadedly received in the housing 11 and includes the annular valve seat surface 16, the central port 17 permitting passage of water from the inlet to the outlet when the valve is open.

A valve stem 18 is provided with suitable threads 19 thereon received in the member 21 threadedly received in the top of the housing 11 and seated at the shoulder 22. An appropriate knob 23 is mounted on the top of the stem and a knurled, splined, or otherwise shaped surface 24 is provided on the stem to mate with the knob and prevent relative rotation therebetween. A suitable screw 26 secures the knob on the stem.

According to one feature of the present invention, a member 27 is mounted to the stem 18 in a "floating" manner. This member includes an O-ring seal 28 in a cylindrical groove thereon, and a bib-washer 29 at the lower end thereof. The bib-washer is disposed to engage and seal on the seat 16 as the stem moves downwardly during rotation thereof by operation of the knob. At the same time, the O-ring 28 sealingly engages and moves along the sealing bore 31 in the housing to prevent any leakage of water up along the stem.

Figure 2:
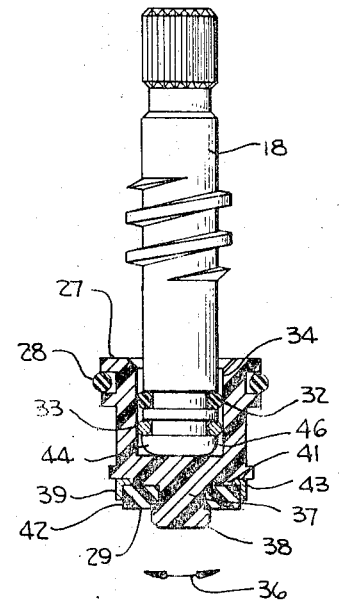
FIG. 2 is an enlarged view of the stem and seal mount, the latter being shown in vertical section.

Referring now to FIG. 2, the stem 18 is provided with two annular grooves near its lower end. An O-ring 32 is provided in the upper one of these grooves, and a snap ring 33 is provided in the lower one of these grooves. A diametral clearance is provided between the stem and the bore 34 in the member 27 so that the member 27 is able to rock to a limited extent back and forth in the direction of the arrows 36, with respect to the stem.

The bib-washer 29 is received on the stud 37 projecting from the lower end of member 27, and is retained by the knob 38 thereon. A washer 39 is piloted on the cylindrical surface 41 of member 27 and receives the outer peripheral surface 42 of the bib-washer within the downwardly turned cylindrical flange 43 of the washer.

Because the member 27, the stud 37 and knob thereon, are all of one homogeneous material, there is no possibility for leakage past the seal washer 29 once it is closed on the seat 16. Excellent seating on the seat is assured by the fact that the member 27 to which the seal washer 29 is mounted can not only rock on the stem as described briefly above, but it can also advance onto the seat without rotation, as the stem is rotated to advance it onto the seat. The features of the illustrated embodiment making this possible will now be described in more detail.

Figures 4, 5:
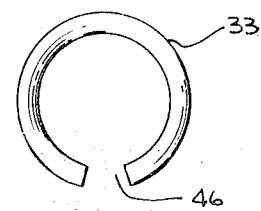
FIG. 4 is a view of a snap ring typically used.
FIG. 5 is a stem end member for use without bib-washer.

Referring to FIG. 4, a simple split ring 33 of circular cross section is shown. This is the ring employed in the lower groove on the stem. The rounded lower end of the stem at 44 facilitates installation of this ring and also further enables the free floating rocking action of the member 27 on the stem. This ring is of such diameter that it must be radially compressed somewhat in order to enter the bore 34 in member 27. The amount of compression is not necessarily enough to close the gap 46 between the ends of the ring but is enough to hold the ring securely in the member 27. Before mounting the ring in member 27, the ring is mounted in the groove on the stem and then the stem is pushed into place as shown in FIG. 2. Although the ring radially contracts as it is moved into the bore 34, it never becomes snug in the bottom of the groove. That is to say that it never is compressed sufficiently to tightly engage the stem in a radial direction. Consequently, although the stem is securely retained in the member 27, and vice versa, the member 27 is freely rotatable on the stem. There is virtually zero resistance to such rotation. Moreover, because of the radial clearance between the stem and the bore, the rocking action can occur and the rounded cross section of the snap ring 33 facilitates this action.

The above described features enable the axial movement of the bib-washer onto and away from the seat 16 without rotation of the bib-washer, so it does not twist or scrub on the seat. A long life of the seat and the bib-washer is a natural result. Reliable seating is also a natural result. Moreover, it is possible to delete the bib-washer and use a lower face of the member 27 itself to sealingly engage the seat 16. An example of this is in FIG. 5 wherein face 47 of member 27a seals on seat 16.

An additional advantage is the fact that the O-ring seal 28 moves only axially and not in rotation, so that it does not twist in the bore 31 and its life is prolonged.

Because the stem end member 27 is so free to rock and rotate on the stem, an O-ring 32 is provided in the additional groove in the valve stem. This O-ring provides a small amount of resistance to rotation of the stem 18 so that a slight torque can be felt, and it eliminates the possibility of vibration of the member 27 on the stem. It also can hold grease in the pocket 46 for lubrication of the snap ring in the stem groove. Addition of O-ring 32 does not cause rotation of the member 27 in the valve housing as the stem is turned, so the member 27 continues to function as described above, without any rotation of seal 28 or seal 29.

Figure 3:
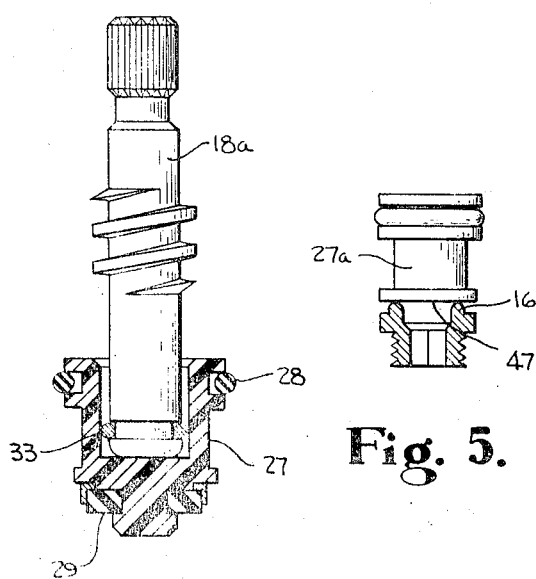
FIG. 3 is an enlarged view similar to FIG. 2 but illustrating an alternative construction.

FIG. 3 shows the stem and seal mount 27 without the O-ring 32, for those installations where zero torque on the stem is considered satisfactory or preferable. Otherwise the structure of FIG. 3 is the same as that of FIG. 2.

By way of example, materials of the various parts may be brass for the stem, nut 21, replaceable seat 14, and washer 39; chrome plated "Cycolac" synthetic resin for knob 23; sulfur-free synthetic rubber for the O-rings and for the bib-washer; and a temperature-stable, nonabsorbent synthetic resin such as chlorinated polyvinyl chloride for the member 27 to which the seals are mounted.

In the event it ever becomes necessary to replace a bib-washer, all that is necessary is to simply pull the member 27 off the end of the stem, and replace it as a unit, complete with bib-washer and O-rings. No tools are required for this.

The member 27 may be made of synthetic resin, which facilitates use of colors therein. A red plastic material may be used for the hot water and blue for the cold water. This can facilitate identification of stem and washer assemblies if the stem for the cold water valve is to have a left-hand thread thereon as in FIG. 1, and that for a hot water valve is to have a right-hand thread thereon as in FIGS. 2 and 3.

I claim:
1. A valve assembly comprising:
a valve stem;
a stem end member received on said stem and rotatable with respect thereto on the longitudinal axis thereof, a portion of said stem being received in a cylindrical bore in said end member;
said stem having a first annular groove therein;
a snap ring loosely received in said groove and snugly received in said bore, to retain said end member on said stem while permitting free rotation of said end member on said stem;
said stem having a second annular groove therein; and
a resilient member received in said second groove and engaging both said stem and said bore to establish a desired amount of resistance to movement of said end member on said stem.